(12) United States Patent
Johnson et al.

(10) Patent No.: US 7,282,107 B2
(45) Date of Patent: Oct. 16, 2007

(54) MULTIPLE HEAD AUTOMATED COMPOSITE LAMINATING MACHINE FOR THE FABRICATION OF LARGE BARREL SECTION COMPONENTS

(75) Inventors: Brice A. Johnson, Federal Way, WA (US); Stephen S. Spoon, Buckley, WA (US); Randal S. Darras, Auburn, WA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 10/646,509

(22) Filed: Aug. 22, 2003

(65) Prior Publication Data

US 2005/0039843 A1    Feb. 24, 2005

(51) Int. Cl.
B65H 81/00    (2006.01)
(52) U.S. Cl. .................. 156/169; 156/173; 156/175; 156/425; 156/433; 156/441
(58) Field of Classification Search ................ 156/169, 156/172, 173, 175, 185, 187, 188, 195, 433, 156/441, 523, 574, 425
See application file for complete search history.

(56) References Cited

U.S. PATENT DOCUMENTS

| | | | | |
|---|---|---|---|---|
| 3,141,806 A | * | 7/1964 | Reinman | 156/425 |
| 3,174,388 A | * | 3/1965 | Gaubatz | 156/169 |
| 3,380,675 A | * | 4/1968 | Baxter, Jr. et al. | 156/443 |
| 3,402,091 A | * | 9/1968 | Trimble | 156/425 |
| 4,804,436 A | | 2/1989 | Debroche et al. | |
| 4,867,834 A | | 9/1989 | Alenskis et al. | |
| 4,946,538 A | * | 8/1990 | Bendarzewski et al. | 156/361 |
| 5,213,646 A | * | 5/1993 | Zsolnay et al. | 156/166 |
| 5,645,677 A | * | 7/1997 | Cahuzac et al. | 156/361 |

(Continued)

FOREIGN PATENT DOCUMENTS

DE    10217918    8/2003

(Continued)

OTHER PUBLICATIONS

Ermert, et al, "R U Reinforcing plastics with robots?", Plastics Engineering, May 1981, pp. 37-46.*

(Continued)

Primary Examiner—Jeff H. Aftergut
(74) Attorney, Agent, or Firm—Ingrassia Fisher & Lorenz, P.C.

(57) ABSTRACT

An aircraft part manufacturing device for automated composite lamination on a mandrel surface of a tool having a rotational axis includes a mechanical supporting structure that supports multiple material delivery heads. The tool is moveable and rotatable relative to the mechanical supporting structure. The mechanical supporting structure provides for axial translation of the material delivery heads relative to the mandrel surface while the mandrel surface is rotated for laying down courses of composite material over the entire mandrel surface of the tool. The position and movement of each of the plurality of material delivery heads is individually adjustable. Arm mechanisms provide motion of each material delivery head in a direction normal to the mandrel surface; rotation about an axis normal to the mandrel surface; circumferential position adjustment in a hoop direction relative to the mandrel surface; and axial position adjustment relative to the other material delivery heads.

63 Claims, 5 Drawing Sheets

U.S. PATENT DOCUMENTS

| | | | |
|---|---|---|---|
| 5,651,850 A * | 7/1997 | Turner et al. | 156/190 |
| 6,050,518 A * | 4/2000 | Ninet et al. | 242/436 |
| 6,073,670 A * | 6/2000 | Koury | 156/425 |
| 6,106,649 A | 8/2000 | Slyne | |
| 6,613,258 B1 | 9/2003 | Maison et al. | |
| 2002/0189749 A1 | 12/2002 | Shieh | |
| 2003/0124287 A1 | 7/2003 | Grosskrueger et al. | |

FOREIGN PATENT DOCUMENTS

| | | |
|---|---|---|
| EP | 0198744 A1 * | 10/1986 |
| WO | WO03035380 | 5/2003 |

OTHER PUBLICATIONS

Figure 1, illustrating two types of doublers, both complex integrated doublers and isolated individual doublers; Brice Johnson, unpublished, 2006, USA.

* cited by examiner

MULTIPLE HEAD AUTOMATED COMPOSITE LAMINATING MACHINE FOR THE FABRICATION OF LARGE BARREL SECTION COMPONENTS

BACKGROUND OF THE INVENTION

The present invention generally relates to manufacturing of large scale structures using composite materials and, more particularly, to automated composite lamination of large aircraft fuselage sections.

The structural performance advantages of composites, such as carbon fiber epoxy and graphite bismaleimide (BMI) materials, are widely known in the aerospace industry. Aircraft designers have been attracted to composites because of their superior stiffness, strength, and lower weight, for example. As more advanced materials and a wider variety of material forms have become available, aerospace usage of composites has increased. Automated tape layer technology has developed to become a widely used automated process for fabrication of large composite structures such as wing panels and empennage. Current tape layer technology has been improved to offer flexibility in process capabilities required for a wide variety of aerospace components. As aerospace industry tape laying applications achieve material lay up rates, for example, that may help control the manufacturing cost of large composite structures, new and innovative applications for tape layers may be defined, such as the automated tape lay up of large aircraft fuselage sections, for example, 15 to 20 feet in diameter.

Automated tape laying machines typically are gantry style machines that may have, for example, ten axes of movement with 5-axis movement on the gantry and 5-axis movement on the delivery head. A typical automated tape layer consists of a gantry structure (parallel rails), a cross-feed bar that moves on precision ground ways, a ram bar that raises and lowers the material delivery head, and the material delivery head which is attached to the lower end of the ram bar. Commercial tape layers are generally configured specifically for lay up of flat or mildly contoured laminate applications using either flat tape laying machines (FTLM) or contour tape laying machines (CTLM). On a gantry style tape layer, tooling (or a flat table) is commonly rolled under the gantry structure, secured to the floor, and the machine delivery head is then initialized to the lay up surface.

FIG. 1A provides an illustration of a typical tape laying machine material delivery head 100. Delivery heads for FTLM and CTLM machines are basically the same configuration as that of delivery head 100 shown in FIG. 1A. The delivery heads on commercial automated tape layers are typically configured to accept material widths of 75 mm (3 inches), 150 mm (6 inches), and 300 mm (12 inches). Flat tape layers typically use material in 150 mm (6 inch) and 300 mm (12 inch) widths. Contour tape layers typically use material in 75 mm (3 inch) and 150 mm (6 inch) widths. CTLM systems normally use the 3-inch or 6-inch wide material when laying up off flat plane contour surfaces. Material 102 for tape layers generally comes in large diameter spools. The tape material 102 has a backing paper 106, which must be extracted as the prepreg (resin pre-impregnated fiber) is applied to the tool surface 108. The spool of material typically is loaded into the delivery head supply reel 104 and threaded through the upper tape guide chute and past the cutters 110. The material 102 then passes through the lower tape guides, under the segmented compaction shoe 112, and onto a backing paper take up reel 114. The backing paper is extracted and wound on a take up roller of paper take up reel 114. The delivery head 100 makes contact with the tool surface 108 and the tape material 102 is "placed" onto the tool surface 108 with compaction pressure. The tape laying machine typically lays tape on the tool surface 108 in a computer programmed path (course), cuts the material 102 at a precise location and angle, lays out tail, lifts delivery head 100 off the tool surface 108, retracts to the course start position, and begins laying the next course. The delivery head 100 may have an optical tape flaw detection system that signals the machine control to stop laying tape material 102 when a flaw has been detected. The delivery head 100 also typically has a heating system 116 that heats the prepreg materials to increase tack levels for tape-to-tape adhesion. Heated tape temperatures generally range from 80 F. to 110 F.

While CTLM delivery heads handle a single piece of wide prepreg tape, fiber placement heads process multiple strips of narrow tape to form a solid band of material similar to tape. Individual prepreg fibers, called tows, are typically one eighth inch wide. Tows 118 are shown in FIGS. 1B, 1C, and 1D. Tows 118 usually are pulled off spools—such as towpreg spool 120—and fed through a fiber delivery system 122 into a fiber placement head 130, which is shown schematically in FIG. 1C. Fiber delivery system 122 may include, for example, a tensioner system 124.

In the fiber placement head 130, tows 118 may be collimated into a single fiber band 126, as shown in FIG. 1B, and laminated onto a work surface, such as surface 140, which can be mounted between a headstock and tailstock. When starting a fiber band or course, such as course 128 shown in FIG. 1D, the individual tows 118 are fed through the head 130 by releasing the clamps 139 and simultaneously activating the pinch rollers 132 against rotating add rollers 134. While the material is being placed, it is usually compacted onto a surface—such as surface 140 with a compaction roller 136. The pinch rollers are retracted once the tows are fed under the compaction roller, allowing each tow to pay out through the head as required by the path along the tool. As the course 128 is being laid down, the head 130 can cut or restart any of the individual tows 118. FIG. 1C shows a cross section schematic of the mechanisms in the fiber placement head 130 for an upper 119a and lower 119b fiber path 119. Each tow path 119 has its own cutter 138, pinch roller 132, and clamp 139 that can be actuated independently from all the other tow paths 119. This permits the width of the fiber band 126, or course 128, to be increased or decreased in increments equal to one tow width as shown in FIG. 1D. Adjusting the width of the fiber band 126, or course 128, eliminates excessive gaps or overlaps between adjacent courses 128. At the end of the course 128, the remaining tows 118 may be cut to match the shape of the ply boundary 142. When the tows are cut, the clamps 39 are simultaneously actuated to prevent it from slipping or being pulled out of the head by the tension. The head 130 may then be positioned to the beginning of the next course 128. During the placement of a course 128, each tow 118 is dispensed at its own speed as determined by the machine path along the tool surface, allowing each tow 118 to independently conform to the surface 140 of the part. Because of this, the fibers, i.e., tows 118, are not restricted to geodesic paths. They can be steered to meet specified design goals. A rolling compaction device, such as compaction roller 136, combined with heat for tack enhancement, laminates the tows 118 onto the lay-up surface 140. This action of pressing tows 118 onto the work surface 140 (or a previously laid ply) adheres the tows 118 to the lay-up surface 140 and removes trapped air, minimizing the need for vacuum debulking. It also allows the fiber to be laid onto concave surfaces.

A fiber placement head 130, like the tape laying head 100, may be provided with several axes of motion, using an arm mechanism, for example, and may be computer numeric controlled. The axes of motion may be necessary to make sure the head 100 or 130 is normal to the surface 108 or 140 as the machine is laminating tows. The machine may also have a number of electronic fiber tensioners, such as tensioner system 124, which may be mounted, for example, in an air conditioned creel. These tensioners may provide individual tow payout and maintain a precise tension. The head 100 or 130 may precisely dispense, cut, clamp, and restart individual prepreg tows 118.

Fuselage fabrication using composites requires automated placement of composite materials at a rate high enough to make the use of composites economical compared to conventional methods of fuselage fabrication. To take advantage of the light weight and high strength of composite materials for newer, larger fuselages to be built will require a break through increase in composite material lay down rates. Current processes such as tape laying and fiber placement are currently too slow to be economically viable to meet production rates on new large scale aircraft programs, such as Boeing's 7E7. Tools and processes for automated placement of composite materials are needed that greatly increase the lay down rates over the state of the art, and which will reduce the number of machines required.

For example, an entire large fuselage skin of constant cross section 60 feet long would typically require three to four weeks to be placed onto a lay-up mandrel using existing technology. Where standard automated lamination processes can place material up to 20 pounds per hour (lbs/hr) sustained, an automated composite placement machine is needed that can approach on the order of 1,000 lbs/hr so that an entire large fuselage skin of constant cross section, which typically may be 60 feet long but can range in length, for example, from about 20 feet to about 110 feet or longer, can be placed onto a lay-up mandrel in a day or two. The reduction in time can significantly increase the practicality and economic viability of manufacturing large aircraft parts, such as large fuselage skins, using composite materials.

As can be seen, there is a need for an automated lay-up machine for composite fabrication of large fuselage sections. There is also a need for fabrication of composite parts using an automated lay up machine and process that greatly increases the lay down rates over the state of the art. Moreover, there is a need for an automated lay up machine and process that will reduce the number of machines that are required, reducing the required factory space and overall capital investment needed.

SUMMARY OF THE INVENTION

In one aspect of the present invention, a device for automated composite lamination on a mandrel surface of a tool having a rotational axis includes a mechanical supporting structure that supports multiple material delivery heads. The tool is moveable relative to the mechanical supporting structure, and the mechanical supporting structure provides for movement of the material delivery heads relative to the mandrel surface. Each of the material delivery heads has an individually adjustable position relative to the mandrel surface.

In another aspect of the present invention, a device for automated composite lamination on a mandrel surface of a tool having a rotational axis includes a mechanical supporting structure that supports multiple material delivery heads. The tool is moveable and rotatable relative to the mechanical supporting structure. The mechanical supporting structure provides for axial translation of the material delivery heads simultaneously relative to the mandrel surface, and the position of each of the material delivery heads relative to the other material delivery heads is individually adjustable.

In still another aspect of the present invention, a device for automated composite lamination on a mandrel surface of a tool having a rotational axis includes a mechanical supporting structure that supports multiple material delivery heads so that they are disposed surrounding the tool. The tool is moveable and rotatable relative to the mechanical supporting structure. The mechanical supporting structure provides for axial translation of the material delivery heads simultaneously relative to the mandrel surface. The position of each of the plurality of material delivery heads relative to the mechanical supporting structure is individually adjustable.

In yet another aspect of the present invention, an aircraft part manufacturing device for automated composite lamination on a mandrel surface of a tool having a rotational axis includes a mechanical supporting structure that supports multiple material delivery heads so that they are disposed surrounding the tool. The tool is moveable and rotatable relative to the mechanical supporting structure. The mechanical supporting structure provides for axial translation of the material delivery heads relative to the mandrel surface. The position of each of the plurality of material delivery heads relative to the mechanical supporting structure is individually adjustable. An arm mechanism connects each material delivery head to the mechanical supporting structure. The arm mechanisms provide motion of each material delivery head relative to the mandrel surface in a direction normal to the mandrel surface; provide rotation of each material delivery head about an axis normal to the mandrel surface; provide a circumferential position adjustment of each material delivery head in a hoop direction relative to the mandrel surface; and provide an axial position adjustment of each material delivery head relative to the mandrel surface.

In a further aspect of the present invention, an aircraft part manufacturing device for automated composite lamination on a mandrel surface of a tool having a rotational axis includes means for supporting multiple material delivery heads so that the tool is moveable relative to the multiple material delivery heads. The device also includes means for providing for movement of the multiple material delivery heads relative to the mandrel surface; and means for providing an individual position adjustment relative to the mandrel surface for each of the multiple material delivery heads.

In a still further aspect of the present invention, a method for automated composite lamination on a mandrel surface of a tool having a rotational axis includes steps of: supporting multiple material delivery heads so that the tool is moveable relative to the multiple material delivery heads; providing for movement of the multiple material delivery heads relative to the mandrel surface; and providing an individual position adjustment relative to the mandrel surface for each of the multiple material delivery heads.

These and other features, aspects and advantages of the present invention will become better understood with reference to the following drawings, description and claims.

DETAILED DESCRIPTION OF THE INVENTION

Figure 1A:
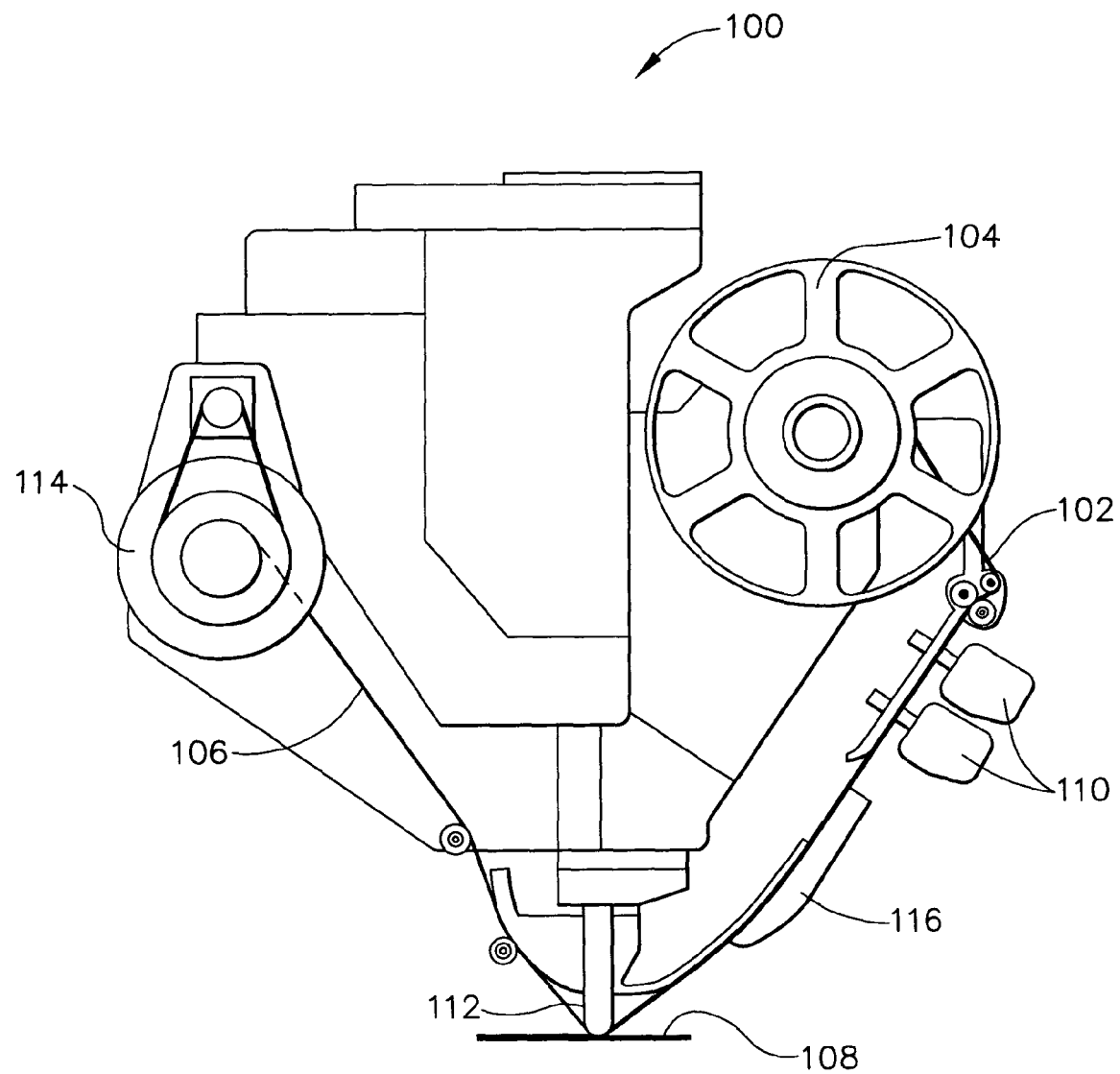
FIG. 1A is a diagram of a typical tape laying machine material delivery head, as known in the art.
Figure 1B:
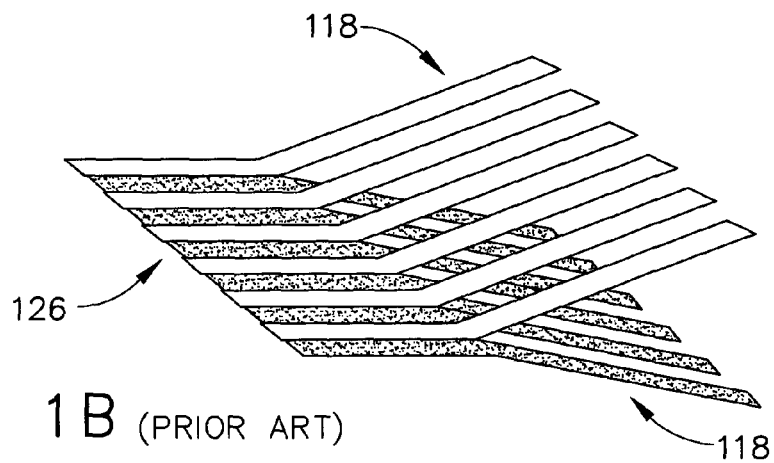
FIG. 1B is a diagram of the collimated band of tows formed by the convergence of separate upper and lower (odd and even) fiber paths, as known in the art.
Figure 1C:
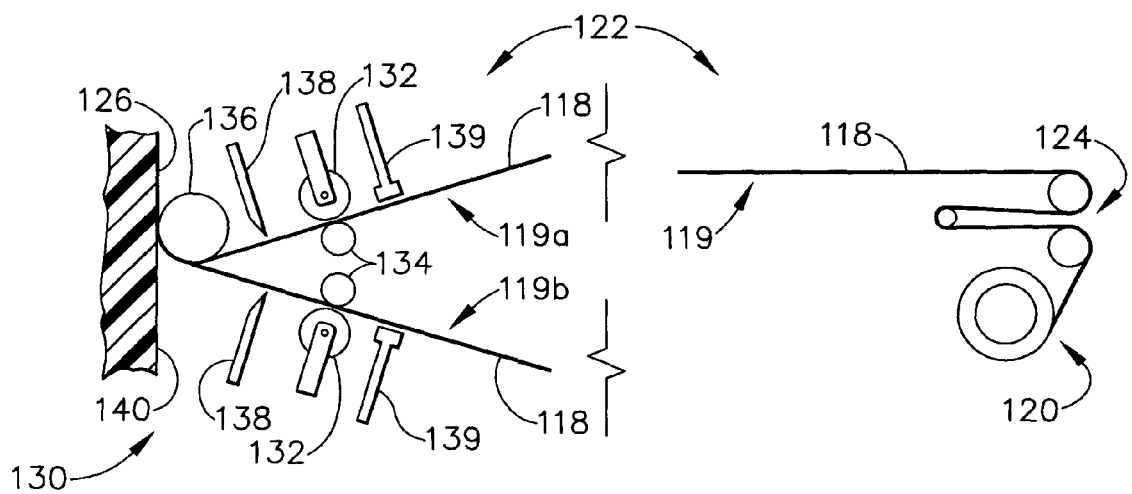
FIG. 1C is a schematic diagram of a typical fiber delivery system and fiber placement head, or fiber placement machine material delivery head, as known in the art.
Figure 1D:
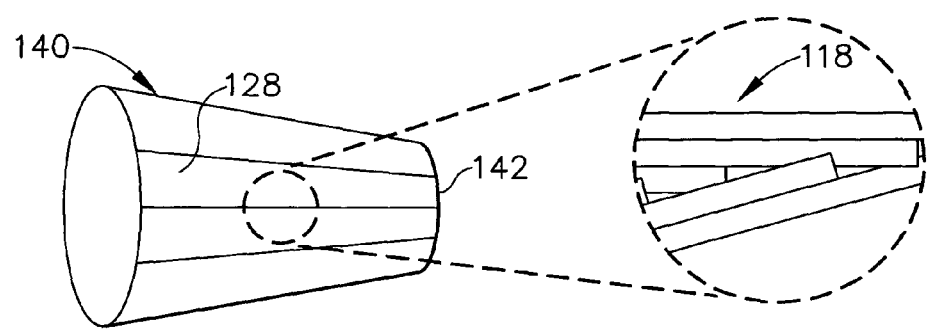
FIG. 1D is a diagram of band tapering effected by cutting of individual prepreg fiber tows, as known in the art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides fabrication of large parts, such as fuselage structures, made of composite materials, which may be used, for example, in the manufacture of commercial and military aircraft. In one embodiment, the present invention enables the automated lay down and compaction of large quantities of high performance composite materials onto large (typically greater than 15 feet in diameter, or maximum thickness), constant cross section, rounded-shaped, for example, circular or elliptical cross-section, mandrels at very high rates compared to the prior art. For example, using one embodiment, placement, i.e. lay down, rates are estimated to be about 48 times faster than prior art composite placement processes such as filament winding, fiber placement, and automated tape laying. Prior art, low lay down rates increase fabrication flows and increase the number of machines needed to meet rate schedules for manufacturing production programs. The savings associated with use of an embodiment of the present invention can drastically reduce flow time to lay-up composite materials, compared to the prior art, and can reduce capital and facilities required to build production fuselage barrel sections at high rates.

In one embodiment, the present invention also may be used in the fabrication from composite materials of large parts, such as fuselage structures, which do not have a constant cross section, such as forward section or aft section of commercial and military aircraft fuselage structures.

In contrast to the single head composite placement machines typical of the prior art, the multiple head configuration of one embodiment enables increased lay down rates compared to the prior art. In one embodiment, lay down rates also may be increased, compared to the prior art, on straight, constant cross section tools through the use of wide pre-impregnated composite tape and CTLM delivery, rather than the narrow material widths (⅛ inch) typically used in fiber placement heads. The use of wide tape may limit the complexity of the lay-up tool to a constant cross section. If the surface is not a constant cross section, the fiber placement heads may be required to properly place material onto the complex contours. The simplicity of the tape head, however, may greatly increase the machine up time, for one embodiment, compared to using the more complex fiber placement type delivery heads.

For example, where a standard fiber placement machine can place a single, 4-inch wide band of material at 1200 inches per minute with about a 40% utilization factor due to head complexity related downtime, one embodiment of the present invention, using six heads, can simultaneously place six courses of a 12-inch wide band of tape at the same speed (1200 inches per minute) with a machine utilization factor of 80%, which is more like that of a typical contour tape laying machine (CTLM). If the same embodiment uses thicker tapes typical of CTLM (190 areal weight (AW)), compared to the thinner material forms of fiber placement (140 AW), in this example, the lay down rate would be 6×80%/40%×(12-inch/4-inch)×190 AW/140 AW=48 times faster than a current state of the art fiber placement machine. For example, it is contemplated that one embodiment, using six tape laying heads, may be capable of laying down at least 700 pounds per hour (lbs/hr) of composite material at peak rate. Peak rate may be described as the average lay down rate not including process downtime or other process interruptions. Peak rate would generally not be considered a sustained production rate where the total hours required to build a part is divided by the total weight of the part. A sustained production rate would include interruptions, including downtime, maintenance, breaks, and other interruptions.

As another example, a 30 ft long, 14 ft diameter barrel section fuselage could be placed using a 6 head, 12 inch wide CTLM configuration in 8 passes (at 0° from the axis of the tool) in (30 ft long×12 inches per foot/600 inches per minute (averaged out for acceleration and deceleration over the 30 ft)+0.24 minutes per pass turnaround time)×8 passes/80% utilization=8.4 minutes. Under the same conditions a single head fiber placement machine would require ((30×12)/600+0.24)×132)/40%=277 minutes or 4.6 hrs and 132 passes, using thinner tape, which will require more plies in the design. Even using thicker tape (190 AW vs. 140 AW) single head fiber placement would require 204 minutes, or 3.4 hours under the same assumptions. For example, it is contemplated that one embodiment, using six fiber placement heads, may be capable of laying down at least 300 lbs/hr of composite material at peak rate.

One embodiment of the invention also addresses the problems of handling large rotating tools by orienting the tool and mandrel in a vertical configuration. Both filament winding and fiber placement typically utilize mounting the tool on a horizontal spindle. The fact that the tool inertia is reacted though a relatively small spindle shaft imposes dynamic instability problems in the tool design. Also the horizontal layout causes sag in large tools. The longer and larger in diameter the tool is, the more severe the dynamic stability and sag issues become. Current tooling technology suggests that the limitation to this horizontal configuration may be well below what is ideal for commercial aircraft production. By orienting the tool with a vertical axis of rotation, problems of sag can be alleviated, and the tool can be mounted on a horizontal turntable so that tool inertia need not be reacted though a relatively small spindle shaft. In addition, by addressing the problems of sag, a vertical configuration may allow more complex mandrel shapes than the straight constant cross section shapes to which a horizontal configuration is typically limited and may be more practical for mounting the fiber placement heads and creels needed for lay down to the more complex shapes.

Figure 2:
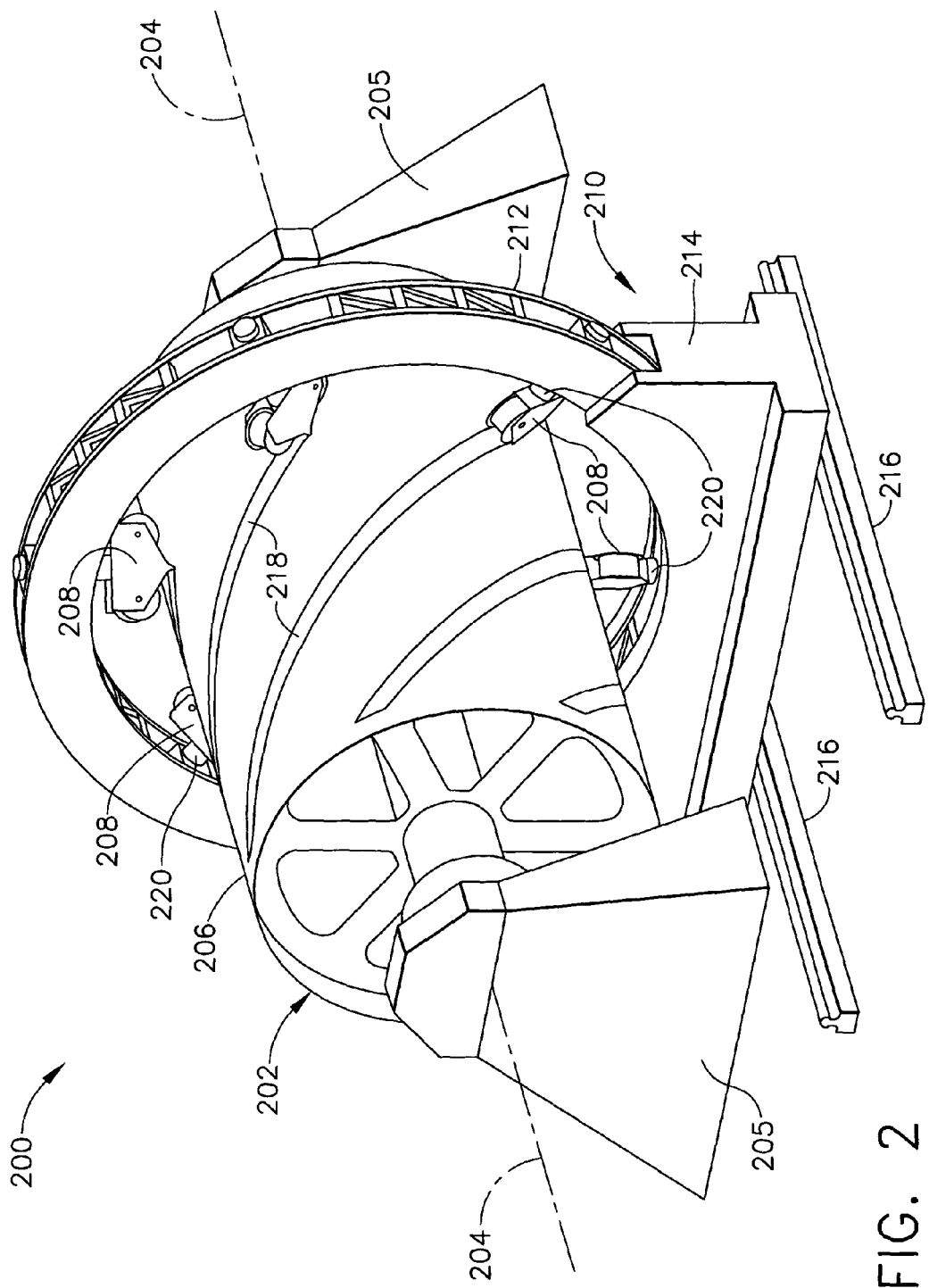
FIG. 2 is a perspective illustration of an aircraft part manufacturing device for automated composite lamination in a horizontal configuration, according to one embodiment of the present invention.

Referring now to FIG. 2, an aircraft part manufacturing device 200 for automated composite lamination is illustrated in accordance with one embodiment. Device 200 may facilitate automated composite lamination using a tool 202. Tool 202 may have an axis 204, about or with regard to which tool 202 may be generally symmetrical, which may be a longitudinal axis of tool 202, and which may be used as a rotational axis of tool 202. Device 200, as it is shown in FIG. 2, exhibits a horizontal configuration in which axis 204 of tool 202 may be oriented horizontally. Tail (or head) stocks 205 may hold tool 202 so that axis 204 is horizontal and may provide for rotation of tool 202 about axis 204 so that axis 204 may be a rotational axis of tool 202. Tool 202 may be removable from tail stocks 205, for example, as tool 202 may be moved from one stage of a manufacturing process to another. Tool 202 may have a mandrel surface 206, which may be of a generally cylindrical nature, i.e., having more or less constant cross section, which may have any shape appropriate for manufacturing with composite materials, for example, rounded rectangular, circular, elliptical, or other shapes. For example, mandrel surface 206 may conform to a middle section of an aircraft fuselage. Mandrel surface 206 may also be of a generally conical nature, i.e., having a tapered, or diminishing, cross section, which may have any shape appropriate for manufacturing with composite materials, for example, rounded rectangular, circular, elliptical, or other shapes. For example, mandrel surface 206 may conform to the complex shapes encountered with a nose section or tail cone section of an aircraft fuselage. Mandrel surface 206 may be approximately symmetrical about rotational axis 204. For the sake of simplicity of illustration, a simple round straight mandrel is shown in the figures, but it is contemplated that mandrel surface 206 may be provided with any shape suitable for manufacturing parts made by laying up composite fiber materials.

Device 200 may include two or more composite dispensing heads, i.e., material delivery heads 208. Material delivery heads 208, for example, may be similar to material delivery head 100—such as a flat tape laying machine or contour tape laying machine—or fiber placement head 130. Material delivery heads 208 may be adaptations of existing delivery heads based on flat or contour tape laying delivery heads, or fiber placement delivery heads, as needed to meet surface contour requirements, as the contour of mandrel surface 206 may vary widely depending on the aircraft part which aircraft part manufacturing device 200 is being used to manufacture. For example, tape laying heads may be used for material delivery heads 208 when the tool 202 and mandrel surface 206 cross sections remain mostly constant, as seen in FIG. 2. By the same token, fiber placement heads may be used for material delivery heads 208 when the cross sections of tool 202 and mandrel surface 206 change significantly along the length of the tool 202.

Figure 3:
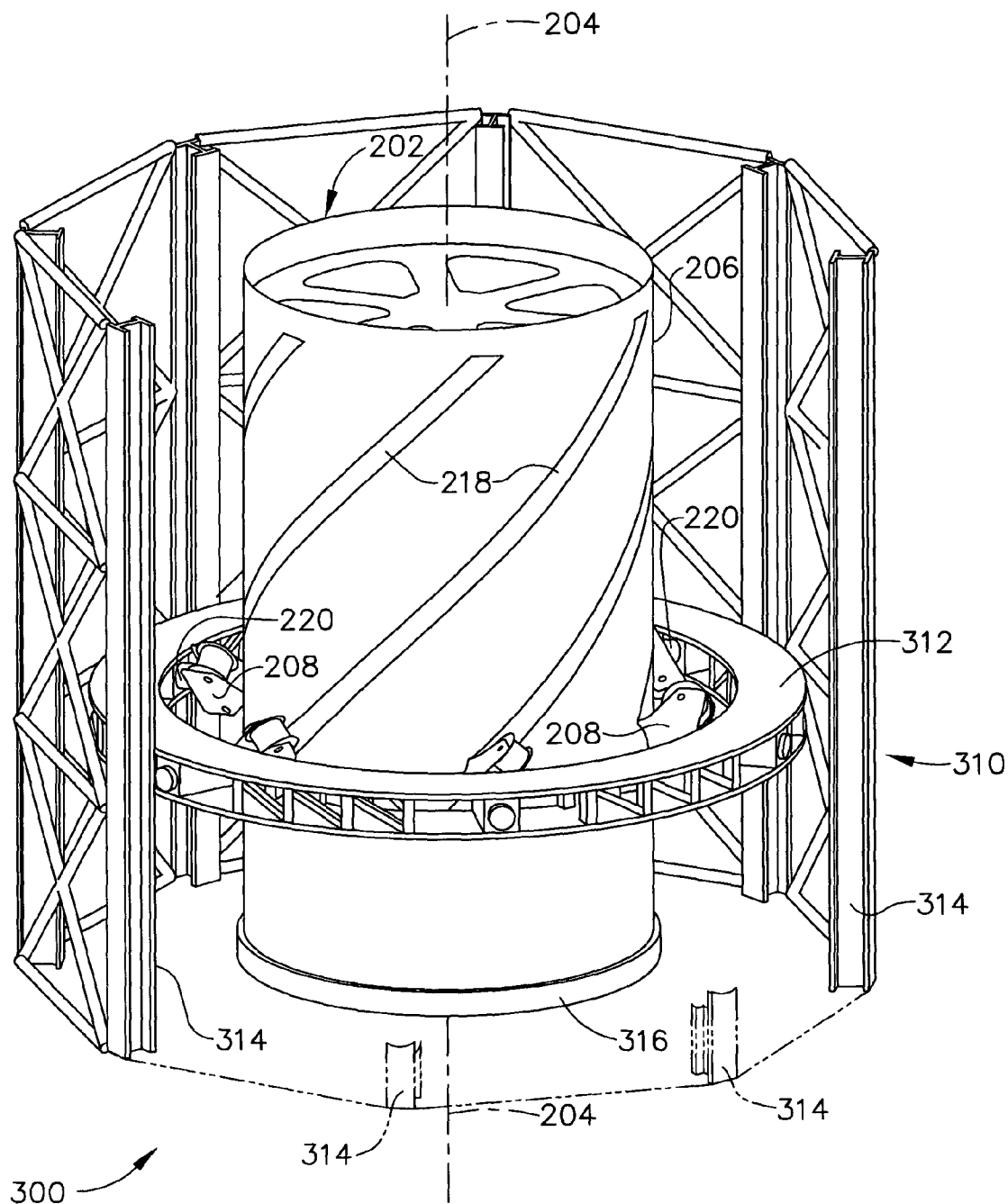
FIG. 3 is a perspective illustration of an aircraft part manufacturing device for automated composite lamination in a vertical configuration, in accordance with another embodiment of the present invention.
Figure 4:
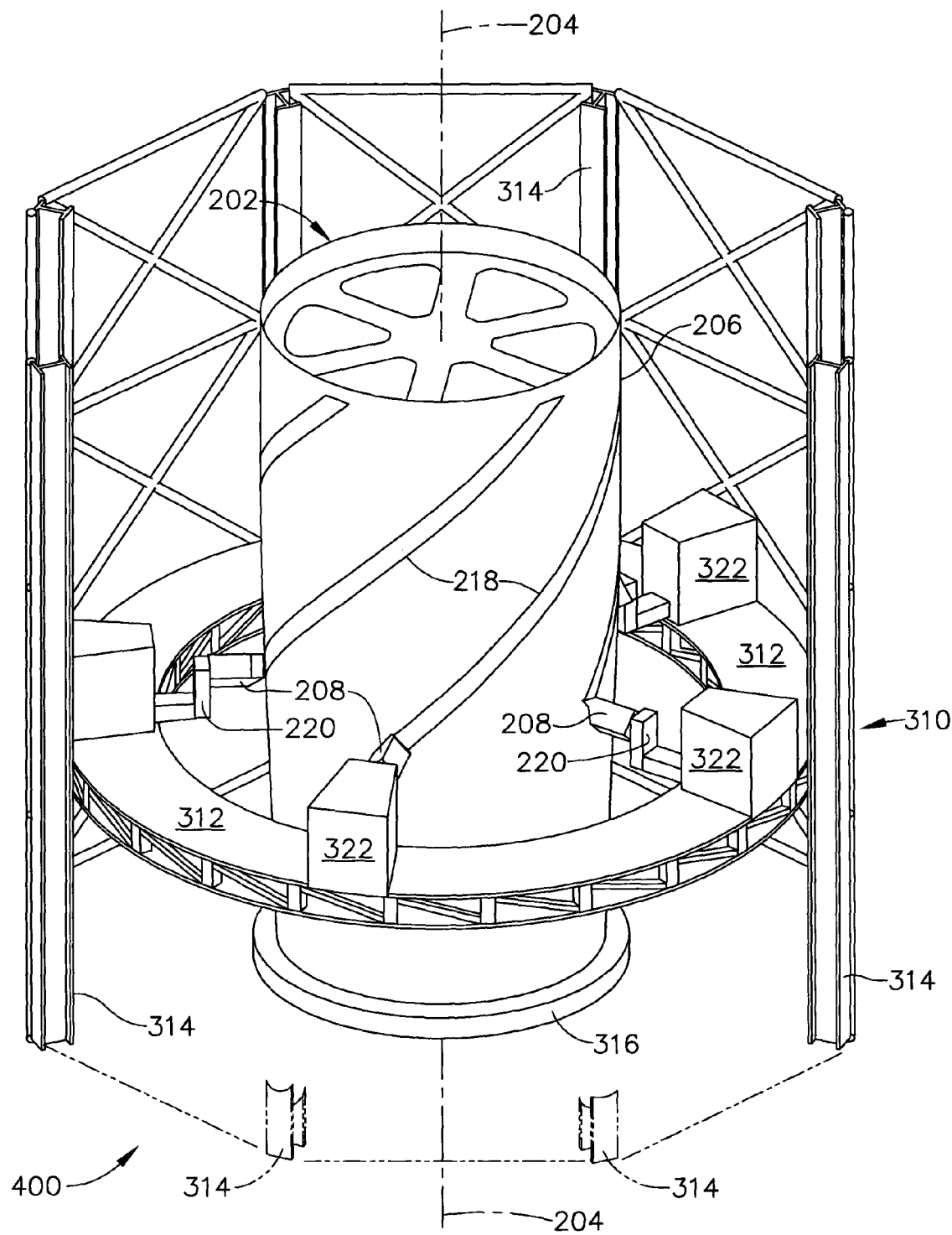
FIG. 4 is a perspective illustration of an aircraft part manufacturing device for automated composite lamination in a vertical configuration, in accordance with an embodiment of the present invention.

The tool 202 may be mounted horizontally, as shown in FIG. 2, or vertically, as shown in FIGS. 3 and 4. FIG. 2 shows a horizontal configuration of device 200 in which material delivery heads 208 may be either tape laying heads or fiber placement heads. In general, the horizontal configuration of device 200 may be more suitable for laying up constant cross section mandrel surfaces 206 using tape laying heads, as seen in FIG. 2, which are typically smaller and more compact than fiber placement heads. FIGS. 3 and 4 show aircraft part manufacturing devices, such as device 200, in accordance with other embodiments that have a vertical configuration in which material delivery heads 208, as seen in FIG. 3, may be tape laying heads—such as material delivery head 100—or, alternatively as seen in FIG. 4, may be fiber placement heads—such as fiber placement head 130. In general, the vertical configuration of device 400, shown in FIG. 4, may be more suitable for laying up changing-cross section mandrel surfaces 206, i.e., surfaces with more complex contours, using fiber placement heads, which are typically more complex than tape laying heads and require a creel system 322 to feed material to the delivery heads.

Device 200 may include a mechanical supporting structure 210 that may support material delivery heads 208 and provide for movement of material delivery heads 208 relative to the mandrel surface 206. Tool 202 may be moveable and rotatable relative to mechanical supporting structure 210. Mechanical supporting structure 210 may include a translating and rotating ring 212 on which material delivery heads 208 may be mounted so that ring 212 and delivery heads 208 surround mandrel surface 206. Mechanical supporting structure 210 may include a ring cradle 214 that may support ring 212 in a vertical orientation as shown in FIG. 2. Ring cradle 214 may provide for rotation of ring 212 around axis 204. Ring cradle 214 may be mounted on rails 216 so that ring cradle 214 may move along the direction of axis 204 of the tool 202. In other words, mechanical supporting structure 210, which may include ring 212 and ring cradle 214, may provide axial translation of all of delivery heads 208 simultaneously relative to mandrel surface 206.

In operation, ring 212 may translate along the entire length of the tool 202 while tool 202 rotates, allowing the material delivery heads 208 to place material in courses 218 over the entire tool surface, i.e., mandrel surface 206. Ring 212 also may rotate along the entire length of the tool 202, also allowing the material delivery heads 208 to place material courses 218 over the entire mandrel surface 206. While rotation of ring 212 may not be needed for material placement in lieu of rotation of tool 202, ring 212 also may rotate so as to be positionable in order to provide for convenient maintenance and servicing of material delivery heads 208. Moreover, tool 202 may rotate independently of the ring 212 to allow access to mandrel surface 206 for hand lay-up operations.

Device 200 may include arm mechanisms 220 connecting material delivery heads 208 to the mechanical supporting structure 210, i.e., to ring 212. While not shown in the figures, it is conceivable that alternative mechanical supporting structures 210, such as an array of rails parallel to rotational axis 204 and surrounding mandrel surface 206, could be used to achieve material delivery simultaneously from multiple material delivery heads 208 without connecting material delivery heads 208 directly to a ring. Arm mechanisms 220 may provide motion of material delivery heads 208 relative to the mandrel surface 206.

For example, each individual material delivery head 208 may have the ability, provided by the arm mechanism 220 connecting the individual material delivery head 208 to mechanical supporting structure 210, to move independently of the other material delivery heads 208 in circumferential (hoop) and axial directions (with reference to the tool 202) to allow for some movement and individual position adjustment relative to the other material delivery heads 208 and relative to the mandrel surface 206.

Independent axial position adjustment would be useful, for example, when placing plies of material in the circumferential direction, or hoop direction of the cylinder of tool 202. In this case, all, or some of the heads might reposition themselves relative to each other axially, along the length of the tool 202, so that the bands, i.e., courses 218, of material placed would be adjacent to each other without overlap or gaps, when placed onto the tool 202 or mandrel surface 206.

Also, for example, each individual material delivery head 208 may have the ability, provided by the arm mechanism 220 connecting the individual material delivery head 208 to mechanical supporting structure 210, to move independently of the other material delivery heads 208 in a direction normal to, i.e., perpendicular to, the mandrel surface 206 and to rotate independently of the other material delivery heads 208 about an axis normal to the mandrel surface 206 (with reference to the tool 202). Thus each material delivery head 208 may be provided with some individual movement and position adjustment toward and away from the mandrel surface 206, and may be provided with some individual rotation and angular position adjustment relative to the mandrel surface 206.

Each of the multiple material delivery heads 208 may be individually controlled in coordination with all of the other delivery heads 208, for example, by expanding existing numerical control (NC) or computer numerical control (CNC) programming software to control all of the material delivery heads 208 simultaneously. The multiple material delivery heads 208 may also be controlled in coordination with the rotation of tool 202 and mandrel surface 206. For example, rotation of tool 202 may be driven through tail stocks 205 using CNC control coordinated with CNC control of the material delivery heads 208.

Referring now to FIG. 3 and FIG. 4, aircraft part manufacturing devices 300 and 400 for automated composite lamination are illustrated in accordance with alternative embodiments. Device 300, shown in FIG. 3, and device 400, shown in FIG. 4, exhibit a vertical configuration in which tool 202 has its rotational axis 204 oriented vertically. Horizontal turntable 316 may hold tool 202 so that rotational axis 204 is vertical and may provide for rotation of tool 202 about rotational axis 204. Tool 202 may be removable from turntable 316, for example, as tool 202 may be moved from one stage of a manufacturing process to another. As described above, tool 202 may have a mandrel surface 206, which may be generally symmetrical with regard to axis 204, and which may have a more complex surface contour than the simple straight cylinder shown in FIGS. 3 and 4 for the sake of simplicity of illustration.

As with device 200, device 300 and device 400 may include multiple material delivery heads 208, which may be, for example, flat tape laying heads, contour tape laying heads, or fiber placement heads. FIGS. 3 and 4 show aircraft part manufacturing devices 300 and 400 that have a vertical configuration in which material delivery heads 208 may be tape laying heads, as shown in FIG. 3, or fiber placement heads, as shown in FIG. 4. In general, device 300, which illustrates the use of tape laying heads for material delivery heads 208, may be more suitable for laying up constant cross section mandrel surfaces 206. In general, device 400, which illustrates the use of fiber placement heads for material delivery heads 208, may be more suitable for laying up changing-cross section mandrel surfaces 206, i.e., surfaces with more complex contours, using fiber placement heads, which are typically more complex than tape laying heads and require a creel system 322 to feed material to the delivery heads.

Devices 300 and 400 may include a mechanical supporting structure 310 that may support material delivery heads 208 and provide for movement of material delivery heads 208 relative to the mandrel surface 206. Tool 202 may be moveable and rotatable relative to mechanical supporting structure 310. Mechanical supporting structure 310 may include a translating and rotating ring 312 on which material delivery heads 208 may be mounted so that ring 312 and delivery heads 208 surround mandrel surface 206. Mechanical supporting structure 310 may include vertical support posts 314 that may support ring 312 in a horizontal orientation as shown in FIGS. 3 and 4. (To simplify and clarify the drawings some of the support posts 314 have been shown in phantom in FIG. 3 and FIG. 4.)

Ring 312 may be connected to vertical support posts 314 so that vertical support posts 314 may provide for vertical movement of ring 312 along the direction of the rotational axis 204 of the tool 202. In other words, mechanical supporting structure 210, which may include ring 312 and vertical support posts 314, may provide axial translation of all of delivery heads 208 simultaneously relative to mandrel surface 206. Horizontal ring 312 may also be used to support creel systems 322. Creel systems 322 may provide material to fiber placement heads when fiber placement heads are used for material delivery heads 208. Creel systems 322 may be mounted on ring 312 as shown in FIG. 4.

In operation, ring 312 may translate along the entire length of the tool 202 while tool 202 rotates on turntable 316, allowing the material delivery heads 208 to place material in courses 218 over the entire tool surface, i.e., mandrel surface 206. As described above, each of the multiple material delivery heads 208 may be individually controlled in coordination with all of the other delivery heads 208, for example, using NC or CNC to control all of the material delivery heads 208 simultaneously. The multiple material delivery heads 208 may be controlled in coordination with the rotation of tool 202 and mandrel surface 206, also using CNC or NC control. For example, rotation of tool 202 may be driven through turntable 316 using CNC control.

Devices 300 and 400 may include arm mechanisms 220 connecting material delivery heads 208 to the mechanical supporting structure 310, i.e., to ring 312. While not shown in the figures, it is conceivable that alternative mechanical supporting structures 310, such as an array of vertical support posts 314 parallel to rotational axis 204 and surrounding mandrel surface 206, could be used to achieve material delivery simultaneously from multiple material delivery heads 208 without connecting material delivery heads 208 directly to a ring. Arm mechanisms 220 may provide motion of material delivery heads 208 relative to the mandrel surface 206.

For example, each individual material delivery head 208 may have the ability, provided by the arm mechanism 220 connecting the individual material delivery head 208 to mechanical supporting structure 310, to move independently of the other material delivery heads 208 in circumferential (hoop) and axial directions (with reference to the tool 202) to allow for some movement and individual position adjustment relative to the other material delivery heads 208 and relative to the mandrel surface 206.

Also, for example, each individual material delivery head 208 may have the ability, provided by the arm mechanism 220 connecting the individual material delivery head 208 to mechanical supporting structure 310, to move independently of the other material delivery heads 208 in a direction normal to, i.e., perpendicular to, the mandrel surface 206 and to rotate independently of the other material delivery heads 208 about an axis normal to the mandrel surface 206 (with reference to the tool 202). Thus each material delivery head 208 may be provided with some individual movement and position adjustment toward and away from the mandrel surface 206, and may be provided with some individual rotation and angular position adjustment relative to the mandrel surface 206.

A method for automated composite lamination on a mandrel surface—such as mandrel surface 206 of tool 202—may include supporting multiple material delivery heads—such as delivery heads 208—so that the tool and material delivery heads are moveable relative to each other. For example, the tool may be mounted horizontally—such as by using tail stocks 205—or may be mounted vertically—such as by using turntable 316—while the multiple material delivery heads may be supported independently of the tool—such as by using mechanical supporting structure 210 or mechanical supporting structure 310.

The method may also include providing for movement of all the material delivery heads relative to the mandrel surface while providing for individual position adjustment relative to the mandrel surface for each material delivery head independently of the others. For example, the mechanical supporting structure 210 or 310 can move all of the material delivery heads together relative to the mandrel surface, for example, translating the material heads axially, i.e., in a direction parallel to the axis 204 of tool 202. At the same time, a circumferential position adjustment of the material delivery heads in a hoop direction relative to the mandrel surface, an axial position adjustment of the material delivery heads relative to the mandrel surface, motion of the material delivery heads in a direction normal to the mandrel surface, and rotation of the material delivery heads about an axis normal to the mandrel surface may be provided, for example, by a mechanisms that connect each material delivery head to the mechanical supporting structure—such as arm mechanisms 220.

The method may further include rotating the tool about a horizontal or vertical axis of rotation—such as axis 204 of tool 202—and delivering a composite material in courses 218 from the multiple material delivery heads 208 simultaneously. The process of material delivery, positioning and moving the material delivery heads, and rotating the tool may be controlled using NC or CNC techniques to provide coordinated control for the multiple material delivery heads simultaneously.

It should be understood, of course, that the foregoing relates to preferred embodiments of the invention and that modifications may be made without departing from the spirit and scope of the invention as set forth in the following claims.

We claim:

1. A method for fabricating a section of an aircraft fuselage using a plurality of material delivery heads to apply composite materials on a mandrel surface of a mandrel having an axis, wherein the mandrel is rotatable relative to said plurality of material delivery heads, and wherein the mandrel surface substantially conforms to the section of the aircraft fuselage, the method comprising steps of:

applying, via the material delivery heads, composite material along the mandrel surface during fabrication of the section of the aircraft fuselage;

moving at least some of said material delivery heads relative to the mandrel surface during application of the composite material by the material delivery heads during fabrication of the section of the aircraft fuselage; and individually adjusting positions of at least some of said material delivery heads relative to the mandrel surface and the other material delivery heads during application of the composite material by the material delivery heads during fabrication of the section of the aircraft fuselage.

2. The method of claim 1, wherein each of the material delivery heads is designed to apply the composite material in a fiber orientation that is independent of fiber orientations of the other material delivery heads.

3. a method for fabricating a section of an aircraft fuselage using a plurality of material delivery heads to apply composite materials on a mandrel surface of a mandrel having an axis, wherein the mandrel is rotatable relative to said plurality of material delivery heads, and wherein the mandrel surface substantially conforms to the section of the aircraft fuselage, the method comprising steps of:

applying, via the material delivery heads, composite material along the mandrel surface during fabrication of the section of the aircraft fuselage;

moving at least some of said material delivery heads relative to the mandrel surface during application of the composite material by the material delivery heads during fabrication of the section of the aircraft fuselage; and individually adjusting positions of at least some of said material delivery heads relative to the mandrel surface and the other material delivery heads during application of the composite material by the material delivery heads during fabrication of the section of the aircraft fuselage.

4. The method of claim 3, further comprising the step of:

rotating at least some of said material delivery heads about an axis normal to the rotational axis during application of the composite material by the material delivery heads during fabrication of the section of the aircraft fuselage.

5. The method of claim 3, wherein at least one of the material delivery heads is designed to apply composite material at a first angle relative to the mandrel, while at least one of the other material delivery heads is simultaneously applying composite material at a second angle relative to the mandrel.

6. The method of claim 3, wherein said step of moving comprises:

translating said plurality of material delivery heads simultaneously in an axial direction relative to said mandrel.

7. The method of claim 3, wherein said step of individually adjusting comprises:

providing a circumferential position adjustment of said material delivery head independent of the other material delivery heads and in a hoop direction relative to the mandrel surface; and providing an axial position adjustment of said material delivery head independent of the other material delivery heads and relative to the mandrel surface.

8. The method of claim 3, wherein said step of individually adjusting comprises:

providing a motion of said at least one material delivery head independent of the other material delivery heads and relative to the mandrel surface in a direction normal to the mandrel surface;

providing a rotation of said at least one material delivery head independent of the other material delivery heads and relative to the mandrel surface about an axis normal to the mandrel surface.

9. The method of claim 3, wherein said step of individually adjusting comprises:
   individually controlling each of said plurality of material delivery heads independently of the other material delivery heads and in coordination with rotation of the mandrel surface of the mandrel.
10. The method of claim 3, further comprising steps of:
   rotating the mandrel about a horizontal axis of rotation; and
   delivering the composite material from said plurality of material delivery heads, wherein:
   at least one of said plurality of material delivery heads is a tape laying machine; and
   said plurality of material delivery heads lays down at least 700 lbs/hr of composite material at peak rate.
11. The method of claim 3, further comprising steps of:
   rotating the mandrel about a horizontal axis of rotation; and
   delivering the composite material from said plurality of material delivery heads, wherein:
   at least one of said plurality of material delivery heads is a fiber placement head, and
   said plurality of material delivery heads lays down at least 300 lbs/hr of composite material at peak rate.
12. The method of claim 3, wherein each of said plurality of material delivery heads is individually controllable independently of said other material delivery heads and in coordination with rotation of the mandrel surface of the mandrel.
13. The method of claim 3, wherein each of the material delivery heads is designed to apply the composite material in a fiber orientation that is independent of fiber orientations of the other material delivery heads.
14. A device for fabricating a section of an aircraft fuselage via automated composite lamination on a mandrel surface, comprising:
   a mandrel comprising a rotational axis and the mandrel surface, wherein the mandrel surface substantially conforms to the section of the aircraft fuselage;
   a mechanical supporting structure moveable relative to the mandrel, wherein the mandrel is rotatable relative to said mechanical supporting structure; and
   a plurality of material delivery heads supported by said mechanical supporting structure, wherein said mechanical supporting structure provides for movement of said plurality of material delivery heads relative to the mandrel surface during fabrication of the section of the aircraft fuselage, and wherein each of said plurality of material delivery heads is:
      designed to apply composite material along the mandrel surface during fabrication of the section of the aircraft fuselage; and
      individually positionally adjustable relative to the mandrel surface and the other material delivery heads during application of the composite material by the material delivery heads during fabrication of the section of the aircraft fuselage.
15. The device of claim 14, wherein each of said plurality of material delivery heads is:
   rotatable about an axis normal to the rotational axis during application of the composite material by the material delivery heads during fabrication of the section of the aircraft fuselage.
16. The device of claim 14, wherein at least one of the material delivery heads is designed to apply composite material at a first angle relative to the mandrel, while at least one of the other material delivery heads is simultaneously applying composite material at a second angle relative to the mandrel.
17. The device of claim 14, wherein said mechanical supporting structure comprises a ring surrounding said mandrel surface and said device further comprises:
   a ring cradle, wherein:
      said ring cradle supports said ring, and
      said ring cradle moves along the direction of the rotational axis of the mandrel.
18. The device of claim 14, further comprising:
   an arm mechanism connecting said at least one material delivery head to said mechanical supporting structure and providing motion of said at least one material delivery head relative to the mandrel surface.
19. The device of claim 14, further comprising:
   a tail stock that holds the mandrel and provides for rotation of the mandrel about the rotational axis of the mandrel.
20. The device of claim 14, wherein at least one of said plurality of material delivery heads is based on a flat tape laying delivery head.
21. The device of claim 14, wherein at least one of said plurality of material delivery heads is based on a contour tape laying delivery head.
22. The device of claim 14, wherein said mechanical supporting structure comprises a ring surrounding said mandrel surface, said ring connected to at least one vertical support post.
23. The device of claim 14, further comprising a horizontal turntable that supports the mandrel so that the rotational axis of the mandrel is vertical.
24. The device of claim 14, further comprising at least one creel system mounted on said mechanical supporting structure, wherein said creel system provides material to at least one of said plurality of material delivery heads.
25. The device of claim 14, wherein at least one of said plurality of material delivery heads is a fiber placement head.
26. The device of claim 14, wherein each of the material delivery heads is designed to apply the composite material in a ply orientation that is independent of ply orientations of the other material delivery heads.
27. The device of claim 14, wherein each of the material delivery heads is designed to apply the composite material in a fiber orientation that is independent of fiber orientations of the other material delivery heads.
28. A device for fabricating a section of an aircraft fuselage via automated composite lamination on a mandrel surface, comprising:
   a mandrel comprising a rotational axis and the mandrel surface, wherein the mandrel surface substantially conforms to the section of the aircraft fuselage;
   a mechanical supporting structure moveable relative to the mandrel, wherein the mandrel is rotatable relative to said mechanical supporting structure; and
   a plurality of material delivery heads supported by said mechanical supporting structure, wherein:
   said mechanical supporting structure provides for axial translation of said plurality of material delivery heads simultaneously relative to the mandrel surface during fabrication of the section of the aircraft fuselage, and wherein each of said plurality of material delivery heads is:
      designed to apply composite material along the mandrel surface during fabrication of the section of the aircraft fuselage; and individually positionally adjustable relative to the mandrel surface and the other material delivery heads during application of the composite material by the material delivery heads during fabrication of the section of the aircraft fuselage.

29. The device of claim 28, wherein each of said plurality of material delivery heads is:
rotatable about an axis normal to the rotational axis during application of the composite material by the material delivery heads during fabrication of the section of the aircraft fuselage.

30. The device of claim 28, wherein at least one of the material delivery heads is designed to apply composite material at a first angle relative to the mandrel, while at least one of the other material delivery heads is simultaneously applying composite material at a second angle relative to the mandrel.

31. The device of claim 28, wherein said mechanical supporting structure comprises a ring surrounding said mandrel surface, and said device further comprises a ring cradle, wherein:
said ring cradle supports said ring in a vertical orientation, and
said ring cradle moves along the direction of the axis of the mandrel to provide said axial translation of said plurality of material delivery heads simultaneously relative to the mandrel surface.

32. The device of claim 28, further comprising:
an arm mechanism connecting said at least one material delivery head to said mechanical supporting structure, wherein:
said arm mechanism provides motion of said at least one material delivery head relative to the mandrel surface; and
said arm mechanism provides an axial position adjustment of said at least one material delivery head relative to the mandrel surface.

33. The device of claim 28, further comprising:
a tail stock that holds the mandrel so that the axis of the mandrel is horizontal and provides for horizontal rotation of the mandrel about the axis.

34. The device of claim 28, wherein at least one of said plurality of material delivery heads is chosen from the group consisting of: flat tape laying delivery head, contour tape laying delivery head, fiber placement delivery head.

35. The device of claim 28, further comprising a horizontal turntable and wherein:
said mechanical supporting structure comprises a ring surrounding said mandrel surface,
said ring is connected to a vertical support post that provides vertical movement of said ring, and
said horizontal turntable supports the mandrel so that the axis of the mandrel is vertical.

36. The device of claim 28, further comprising at least one creel system mounted on said mechanical supporting structure, wherein said creel system provides material to at least one of said plurality of material delivery heads and said at least one of said plurality of material delivery heads is a fiber placement head.

37. The device of claim 28, wherein said plurality of material delivery heads are simultaneously controllable independent of each other.

38. The device of claim 28, wherein each of the material delivery heads is designed to apply the composite material in a ply orientation that is independent of ply orientations of the other material delivery heads.

39. The device of claim 28, wherein each of the material delivery heads is designed to apply the composite material in a fiber orientation that is independent of fiber orientations of the other material delivery heads.

40. A device for fabricating a section of an aircraft fuselage via automated composite lamination on a mandrel surface, comprising:
a mandrel comprising a rotational axis and the mandrel surface, wherein the mandrel surface substantially conforms to the section of the aircraft fuselage;
a mechanical supporting structure moveable relative to the mandrel, wherein the mandrel is rotatable relative to said mechanical supporting structure; and
a plurality of material delivery heads supported by said mechanical supporting structure and disposed surrounding the mandrel, wherein:
said mechanical supporting structure provides for: axial translation of said plurality of material delivery heads simultaneously relative to the mandrel surface during fabrication of the section of the aircraft fuselage, and wherein each of said plurality of material delivery heads is:
designed to apply composite material along the mandrel surface during fabrication of the section of the aircraft fuselage; and
individually positionally adjustable relative to the mandrel surface, the mechanical supporting structure and the other material delivery heads during application of the composite material by the material delivery heads during fabrication of the section of the aircraft fuselage.

41. The device of claim 40, wherein each of said plurality of material delivery heads is:
rotatable about an axis normal to the rotational axis during application of the composite material by the material delivery heads during fabrication of the section of the aircraft fuselage.

42. The device of claim 40, wherein at least one of the material delivery heads is designed to apply composite material at a first angle relative to the mandrel, while at least one of the other material delivery heads is simultaneously applying composite material at a second angle relative to the mandrel.

43. The device of claim 40, further comprising:
an arm mechanism connecting said at least one material delivery head to said mechanical supporting structure, wherein:
said arm mechanism provides motion of said at least one material delivery head independent of the other material delivery heads and relative to the mandrel surface in a direction normal to the mandrel surface;
said arm mechanism provides rotation of said at least one material delivery head independent of the other material delivery heads and relative to the mandrel surface about an axis normal to the mandrel surface;
said arm mechanism provides a circumferential position adjustment of said at least one material delivery head independent of the other material delivery heads and in a hoop direction relative to the mandrel surface; and
said arm mechanism provides an axial position adjustment of said at least one material delivery head independent of the other material delivery heads and relative to the mandrel surface.

44. The device of claim 40, wherein said mechanical supporting structure comprises a ring surrounding said mandrel surface, and said device further comprises:

a tail stock that holds the mandrel so that the rotational axis of the mandrel is horizontal and provides for horizontal rotation of the mandrel; and a ring cradle, wherein:
said ring cradle supports said ring in a vertical orientation,
said ring cradle moves along the direction of the rotational axis of the mandrel to provide said axial translation of said plurality of material delivery heads simultaneously relative to the mandrel surface,
at least one of said plurality of material delivery heads is a tape laying delivery head; and
said plurality of material delivery heads is capable of laying down at least 700 lbs/hr of composite material.

45. The device of claim 40, further comprising a horizontal turntable and at least one creel system, wherein:
said horizontal turntable supports the mandrel so that the rotational axis of the mandrel is vertical and rotates the mandrel about the rotational axis of the mandrel,
said mechanical supporting structure comprises a ring oriented horizontally and surrounding said mandrel surface,
said ring is connected to at least one vertical support post that provides vertical movement of said ring,
said at least one creel system is mounted on said ring,
said creel system provides material to at least one of said plurality of material delivery heads,
said at least one of said plurality of material delivery heads is a fiber placement head, and
said plurality of material delivery heads is capable of laying down at least 300 lbs/hr of composite material.

46. The device of claim 40, wherein each of said plurality of material delivery heads is individually controllable independently of said other material delivery heads and in coordination with rotation of the mandrel surface of the mandrel.

47. The device of claim 40, wherein each of the material delivery heads is designed to apply the composite material in a fiber orientation that is independent of fiber orientations of the other material delivery heads.

48. An aircraft part manufacturing device for fabricating a section of an aircraft fuselage via automated composite lamination on a mandrel surface, comprising:
a mandrel comprising a rotational axis and the mandrel surface, wherein the mandrel surface substantially conforms to the section of the aircraft fuselage;
a mechanical supporting structure moveable relative to the mandrel, wherein the mandrel is rotatable relative to said mechanical supporting structure;
a plurality of material delivery heads supported by said mechanical supporting structure and disposed surrounding the mandrel, wherein said mechanical supporting structure provides for axial translation of said plurality of material delivery heads relative to the mandrel surface during fabrication of the section of the aircraft fuselage, and wherein each of said plurality of material delivery heads is:
designed to apply composite material along the mandrel surface during fabrication of the section of the aircraft fuselage;
individually positionally adjustable relative to the mandrel surface, the mechanical supporting structure and the other material delivery heads during application of the composite material by the material delivery heads during fabrication of the section of the aircraft fuselage; and an arm mechanism connecting said at least one material delivery head to said mechanical supporting structure, wherein:
said arm mechanism provides motion of said at least one material delivery head independent of the other material delivery heads and relative to the mandrel surface in a direction normal to the mandrel surface;
said arm mechanism provides rotation of said at least one material delivery head independent of the other material delivery heads and relative to the mandrel surface about an axis normal to the mandrel surface;
said arm mechanism provides a circumferential position adjustment of said at least one material delivery head independent of the other material delivery heads and in a hoop direction relative to the mandrel surface; and
said arm mechanism provides an axial position adjustment of said at least one material delivery head independent of the other material delivery heads and relative to the mandrel surface.

49. The device of claim 48, wherein each of said plurality of material delivery heads is:
rotatable about an axis normal to the rotational axis during application of the composite material by the material delivery heads during fabrication of the section of the aircraft fuselage.

50. The device of claim 48, wherein at least one of the material delivery heads is designed to apply composite material at a first angle relative to the mandrel, while at least one of the other material delivery heads is simultaneously applying composite material at a second angle relative to the mandrel.

51. The device of claim 48, wherein each of said plurality of material delivery heads is individually controllable independently of said other material delivery heads and in coordination with rotation of the mandrel surface of the mandrel.

52. The device of claim 48, wherein each of the material delivery heads is designed to apply the composite material in a fiber orientation that is independent of fiber orientations of the other material delivery heads.

53. An aircraft part manufacturing device for fabricating a section of an aircraft fuselage via automated composite lamination on a mandrel surface, comprising:
a mandrel comprising a rotational axis and the mandrel surface, wherein the mandrel surface substantially conforms to the section of the aircraft fuselage;
means for supporting a plurality of material delivery heads, wherein the mandrel is moveable relative to said plurality of material delivery heads during fabrication of the section of the aircraft fuselage, and wherein each of said plurality of material delivery heads is designed to apply composite material along the mandrel surface during fabrication of the section of the aircraft fuselage;
means for providing for movement of said plurality of material delivery heads relative to the mandrel surface during fabrication of the section of the aircraft fuselage; and
means for providing an individual position adjustment relative to the mandrel surface for said plurality of material delivery heads during fabrication of the section of the aircraft fuselage, wherein each of said plurality of material delivery heads is: individually positionally adjustable relative to the mandrel surface and the other material delivery heads during application of the composite material by the material delivery heads during fabrication of the section of the aircraft fuselage.

54. The device of claim 53, wherein at least one of the material delivery heads is designed to apply composite material at a first angle relative to the mandrel, while at least one of the other material delivery heads is simultaneously applying composite material at a second angle relative to the mandrel.

55. The device of claim 53, wherein said means for supporting said plurality of material delivery heads includes means for translating said plurality of material delivery heads in an axial direction relative to said mandrel.

56. The device of claim 53, wherein said means for providing an individual position adjustment comprises:
means for providing an axial position adjustment of said material delivery heads relative to the mandrel surface and independent of the other material delivery heads.

57. The device of claim 53, wherein said means for providing an individual position adjustment comprises:
means for providing a circumferential position adjustment of said material delivery heads in a hoop direction relative to the mandrel surface and independent of the other material delivery heads.

58. The device of claim 53, wherein each of said plurality of material delivery heads is: rotatable about an axis normal to the rotational axis during application of the composite material by the material delivery heads during fabrication of the section of the aircraft fuselage, and wherein said means for providing an individual position adjustment comprises:
means for providing a motion of said material delivery heads relative to the mandrel surface in a direction normal to the mandrel surface and independent of the other material delivery heads; and
means for providing a rotation of said material delivery heads relative to the mandrel surface about an axis normal to the mandrel surface and independent of the other material delivery heads.

59. The device of claim 53, wherein said means for providing an individual position adjustment comprises:
means for individually controlling each of said plurality of material delivery heads independently of the other material delivery heads and in coordination with rotation of the mandrel surface of the mandrel.

60. The device of claim 53, wherein each of said plurality of material delivery heads is individually controllable independently of said other material delivery heads and in coordination with rotation of the mandrel surface of the mandrel.

61. The device of claim 53, wherein each of the material delivery heads is designed to apply the composite material in a fiber orientation that is independent of fiber orientations of the other material delivery heads.

62. A device for fabricating a section of a vehicle via automated composite lamination on a mandrel surface, comprising:
a mandrel comprising a rotational axis and the mandrel surface, wherein the mandrel surface substantially conforms to the section of the vehicle;
a mechanical supporting structure moveable relative to the mandrel, wherein the mandrel is rotatable relative to said mechanical supporting structure; and
plurality of material delivery heads supported by said mechanical supporting structure, wherein said mechanical supporting structure provides for movement of said plurality of material delivery heads relative to the mandrel surface during fabrication of the section of the vehicle, and wherein each of said plurality of material delivery heads is:
designed to apply composite material along the mandrel surface during fabrication of the section of the vehicle; and
individually positionally adjustable relative to the mandrel surface and the other material delivery heads during fabrication of the section of the vehicle.

63. The device of claim 62, wherein each of the material delivery heads is designed to apply the composite material in a fiber orientation that is independent of fiber orientations of the other material delivery heads.

* * * * *